(12) United States Patent
Bytheway et al.

(10) Patent No.: US 9,760,226 B2
(45) Date of Patent: *Sep. 12, 2017

(54) LINEAR PROJECTED SINGLE-LAYER CAPACITANCE SENSOR

(71) Applicant: CIRQUE CORPORATION, Salt Lake City, UT (US)

(72) Inventors: Jared G. Bytheway, Sandy, UT (US); Keith L. Paulsen, Centerville, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,383

(22) Filed: Jun. 23, 2015

(65) Prior Publication Data

US 2015/0286321 A1 Oct. 8, 2015

Related U.S. Application Data

(63) Continuation of application No. 13/308,323, filed on Nov. 30, 2011, now Pat. No. 9,063,590.

(60) Provisional application No. 61/418,047, filed on Nov. 30, 2010.

(51) Int. Cl.
| | |
|---|---|
| *G09G 5/00* | (2006.01) |
| *G06F 3/044* | (2006.01) |
| *G06F 3/0354* | (2013.01) |

(52) U.S. Cl.
CPC .......... *G06F 3/044* (2013.01); *G06F 3/03547* (2013.01)

(58) Field of Classification Search
CPC ....... G06F 3/044; G06F 3/048; G06F 3/03547

USPC ................................ 345/173–174; 178/18.06
See application file for complete search history.

(56) References Cited

U.S. PATENT DOCUMENTS

| | | | | |
|---|---|---|---|---|
| 3,699,439 | A | 10/1972 | Turner | |
| 4,353,552 | A | 10/1982 | Pepper | |
| 7,148,704 | B2 | 12/2006 | Philipp | |
| 8,004,500 | B2 * | 8/2011 | Elias | G06F 3/044 |
| | | | | 178/18.01 |
| 8,378,987 | B2 * | 2/2013 | Huang | G06F 3/0416 |
| | | | | 178/18.06 |

(Continued)

FOREIGN PATENT DOCUMENTS

| | | |
|---|---|---|
| JP | H03050242 | 5/1991 |
| WO | 2005020056 A1 | 3/2005 |

*Primary Examiner* — Jennifer Nguyen
(74) *Attorney, Agent, or Firm* — Morriss O'Bryant Compagni Cannon, PLLC (57) ABSTRACT

A touch sensor having a plurality of parallel drive electrodes that are being electrically driven, providing stimulus on one end or simultaneously on both ends, thus creating a linear or varying electric field across the length of the drive electrodes, wherein adjacent sensor electrodes are connected to a sense amplifier and analog-to-digital (ADC) converter to determine the position of an object that comes near to the drive and/or sense electrodes, wherein the system uses self-capacitance and measures the amount of current driven by each driver, wherein the system uses a mutual capacitance current divider in a first method by driving an electrode with a time varying voltage and measuring induced currents at each end of an adjacent sense electrode and using ratiometric equations to determine finger position, and using a mutual capacitance voltage divider in a second method.

3 Claims, 6 Drawing Sheets

(56) References Cited

U.S. PATENT DOCUMENTS

| | | | |
|---|---|---|---|
| 9,007,310 B1* | 4/2015 | Olson | G06F 3/041 |
| | | | 345/173 |
| 9,063,590 B2* | 6/2015 | Bytheway | G06F 3/044 |
| 2004/0104826 A1* | 6/2004 | Philipp | G01D 5/24 |
| | | | 341/34 |
| 2004/0217945 A1 | 11/2004 | Miyamoto | |
| 2006/0207806 A1 | 9/2006 | Philipp | |
| 2008/0099253 A1 | 5/2008 | Ishikura | |
| 2008/0158181 A1 | 7/2008 | Hamblin | |
| 2008/0158182 A1 | 7/2008 | Westerman | |
| 2008/0158198 A1* | 7/2008 | Elias | G06F 3/044 |
| | | | 345/174 |
| 2009/0008161 A1 | 1/2009 | Jones et al. | |
| 2010/0007625 A1 | 1/2010 | Jiang | |
| 2010/0289759 A1 | 11/2010 | Fisher et al. | |
| 2010/0292945 A1* | 11/2010 | Reynolds | G06F 3/044 |
| | | | 702/65 |
| 2012/0105081 A1* | 5/2012 | Shaikh | G06K 9/0002 |
| | | | 324/686 |

* cited by examiner

LINEAR PROJECTED SINGLE-LAYER CAPACITANCE SENSOR

CROSS REFERENCE TO RELATED APPLICATIONS

This application is a continuation of U.S. patent application Ser. No. 13/308,323, filed on Nov. 30, 2011, now U.S. Pat. No. 9,063,590, which claims priority to U.S. Provisional Patent Application Ser. No. 61/418,047, filed on Nov. 30, 2010, the entirety of each of which is incorporated by this reference.

BACKGROUND OF THE INVENTION

Field of the Invention

This invention relates generally to touch sensor technology. Specifically, the invention is related to the sensing system utilized by a capacitive touch sensors using mutual capacitance or self-capacitance technology to detect and track conductive objects in contact with and/or in proximity to the touch sensor, wherein drive electrodes are driven from one or both ends and sensing is performed on one or both ends of the same electrodes to determine the position of a pointing object along a length thereof.

Description of Related Art

To understand how the present invention is different from prior art touchpad technologies, it is helpful to examine traditional projected capacitance sensors from the prior art. Specifically, this document shows one mutual capacitance and one self-capacitance touchpad system.

Figure 1:
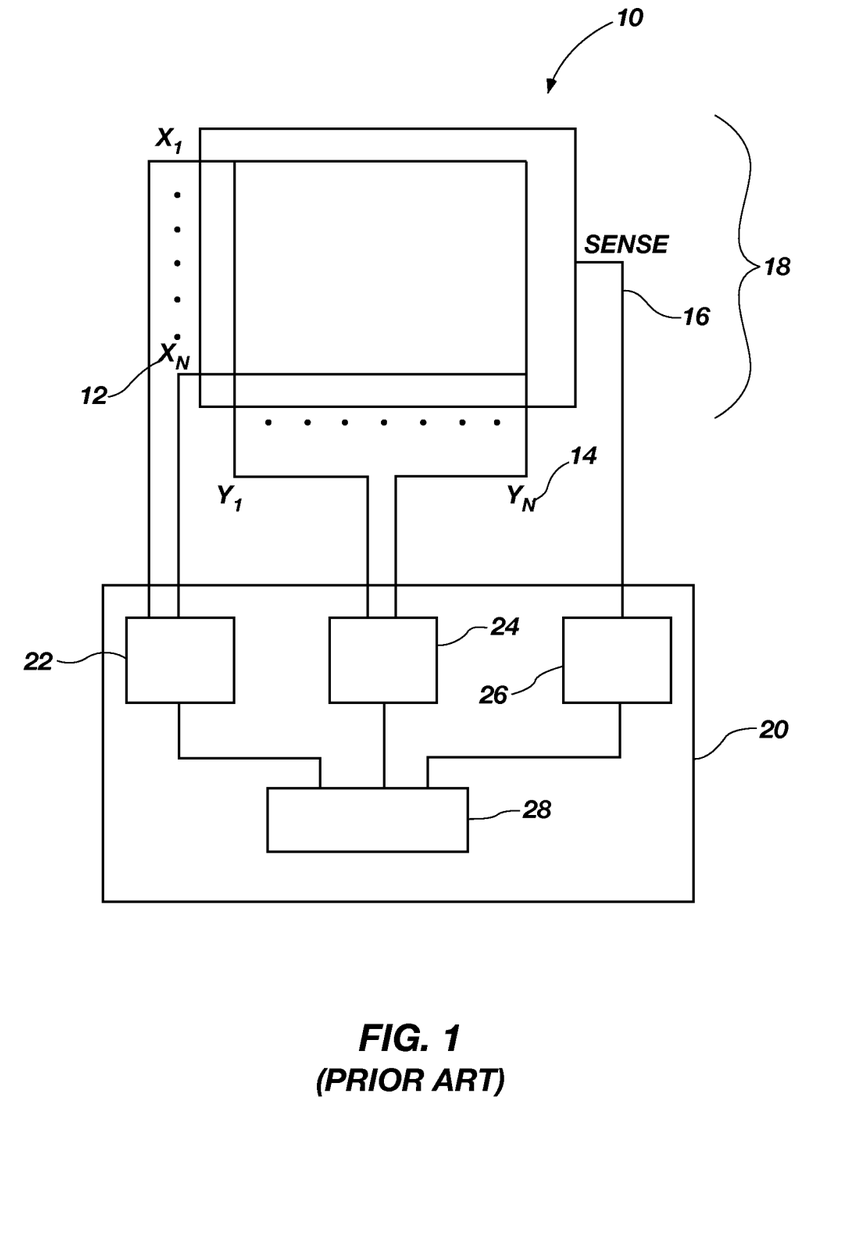
FIG. 1 is a prior art schematic diagram of a touchpad.

The CIRQUE® Corporation touchpad is a mutual capacitance-sensing device and an example is illustrated in FIG. 1. The touchpad can be implemented using an opaque surface or using a transparent surface. Thus, the touchpad can be operated as a conventional touchpad or as a touch sensitive surface on a display screen, and thus as a touch screen.

In this touchpad technology of Cirque® Corporation, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode. However, the row and column electrodes can also act as the sense electrode, so the important aspect is that at least one electrode is driving a signal, and another electrode is used for detection of a signal.

In more detail, FIG. 1 shows a capacitance sensitive touchpad 10 as taught by CIRQUE® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P,N generators 22, 24 (positive and negative) that are sent directly to the X and Y electrodes 12, 14 in various patterns. Accordingly, there is typically a one-to-one correspondence between the number of electrodes on the touchpad electrode grid, and the number of drive pins on the touchpad sensor control circuitry 20. However, this arrangement can be modified using multiplexing of electrodes.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 12×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the function of the sense electrode can also be performed by the X or Y electrodes through the use of multiplexing. Either design will enable the present invention to function.

In contrast, a self-capacitance touchpad typically depends on being able to determine the absolute capacitance value on each individual electrode. Absolute capacitance is determined by simultaneously measuring the absolute voltage on each X and Y electrode. It is important to its operation that a known or predetermined amount of electrical charge be injected onto the X and Y electrodes. Furthermore, the charge must be relatively small or the touchpad will not be able to subtract an offset.

It is noted that for multi-touch touchpad applications, the mutual capacitance system is preferred because of the inherent ability to avoid problem issues such as ghosting.

Traditional projected capacitance sensors such as those described above require at least two planes of conductors that make up X and Y grid patterns. However, multiple conductive planes can be expensive to manufacture. Therefore, it would be an advantage over the prior art to eliminate the second plane of electrodes and use only a single plane of electrodes while still using the fundamental principles of projected capacitance sensors.

While discussing the touch sensors of the present invention, it should be understood that touch sensors include any capacitive touch sensor that uses electrodes in a sensor assembly, and includes such items as touchpads, touchscreens and derivative devices, including sensors that are opaque and generally transparent.

BRIEF SUMMARY OF THE INVENTION

It is an object of the present invention to provide a touch sensor having a plurality of parallel drive electrodes that are being electrically driven, providing stimulus on one end or simultaneously on both ends, thus creating a linear or varying electric field across the length of the drive electrodes, wherein adjacent sensor electrodes are connected to a sense amplifier and analog-to-digital (ADC) converter to determine the position of an object that comes near to the drive and/or sense electrodes, wherein the system uses self-capacitance and measures the amount of current driven by each driver, wherein the system uses a mutual capacitance current divider in a first method by driving an electrode with a time varying voltage and measuring induced currents at each end of an adjacent sense electrode and using ratiometric equations to determine finger position, and using a mutual capacitance voltage divider in a second method.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 2:
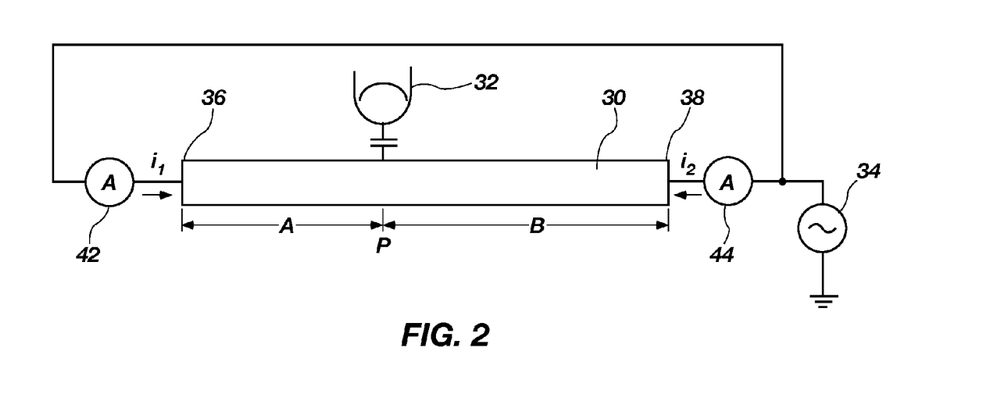
FIG. 2 is a schematic diagram showing a single electrode used as both drive and sense when using a self-capacitance method.

The first method of the present invention is directed to using self-capacitance. This method can work with a single electrode 30 that functions as both the drive and the sense electrode of a touch sensor. The electrode 30 is a resistive material, and the finger 32 is capacitively coupled to the electrode when it gets near as shown. The thickness of the electrodes in these figures are all exaggerated for illustration purposes only.

A signal is generated by a time varying voltage source 34. The voltage source 34 is coupled to both ends of the electrode 30 to simultaneously drive both ends, with a first end 36 being driven with a current i1, and the opposite end 38 being driven with a current i2. The designation of the ends is arbitrary and does not affect operation. In this figure, the finger 32 is shown as being at position P along the length of the electrode 30.

Before a finger position can be determined, a baseline or nominal measurement is taken with no object influencing current flow through the electrode 30. With manufacturing fluctuations and various imperfections in manufacturing of the electrodes, drive signal and current measuring hardware, there will always be a need to be able to subtract out the differences in current flow from a baseline measurement as compared to the measurements made when a finger is being detected.

After calculating the baseline current flows through the electrode 30, calculating the position P is accomplished using a ratio of measured currents i1 and i2 as measured by the ammeters 42 and 44. When a finger or other conductive object approaches the electrode 30, the capacitive loading on the electrode is increased at that location. The increase of loading capacitance causes an increase in the drive currents i1 and i2. The amount of drive current from each end of the electrode 30 is dependent upon the distance of the finger 32 from the electrode ends 36 and 38. Less current is being driven for i1 when the finger is near that end of the electrode 30. Likewise, more current would be driven by i2 when the finger is farther from the end where i2 is being driven.

Assuming that the current i1 is being driven from electrode end 36 and the current i2 is being driven from the electrode end 38, the position P can be calculated using a simple ratio. Relative to the electrode end 36 where current i1 is driven, the position P is determined using the equation:

$$P = i1/i1 + i2$$

Likewise, the position P relative to the electrode end 38 where current i2 is driven, the position P is determined using the equation:

$$P = i2/i1 + i2$$

The baseline measurement is subtracted from the currents when it is a significant amount of current.

An important aspect of the first embodiment above is that the position determining system can be adapted to any number of electrodes. In other words, a large number of voltage sources and ammeters can be used to simultaneously drive and measure the currents on a plurality of electrodes, or the voltage sources and ammeters can be multiplexed and coupled to a plurality of electrodes in a desired sequence or pattern.

Figure 3:
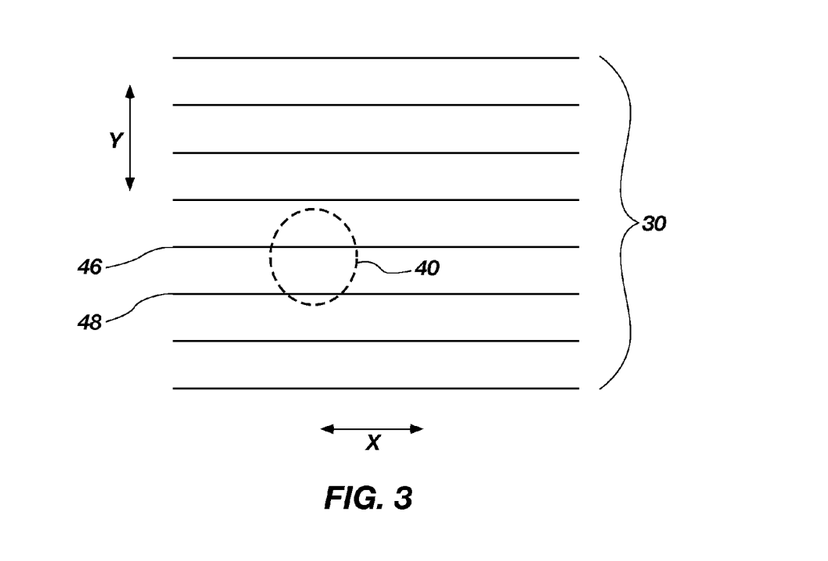
FIG. 3 is a schematic diagram showing how the Y position can be interpolated using data collected from determining the position of the finger in the X axis with high precision.

Another aspect of the invention is that it is not necessary to use another set of electrodes disposed orthogonally to present set of electrodes in order to determine position in the other axis. Thus, consider a plurality of electrodes as shown in FIG. 3. FIG. 3 shows an array of electrodes 30. A finger 40 is shown as an outline. The finger 40 will be detected very strongly by electrodes 46 and 48, and possible by the electrodes immediately adjacent above and below these electrodes, or even beyond. While the equations described previously can easily determine the position P of the finger 40 in the X axis along the length of the electrodes 30, another method must be used in the Y axis.

For example, the amount of current being driven onto the electrodes 46 and 48 is going to be higher than on all other electrodes. Furthermore, unless the finger 40 is disposed exactly between the electrodes 46 and 48, the electrode closest to the finger will be driving more current than the other. Using the relative amounts of current being driven on the electrodes 30, it is possible to interpolate the position of the finger in the Y axis without taking any other measurements.

In another embodiment the resistive electrodes can have shapes other than long and thin wires or rectangles. For example, the electrode can have one or more expanded regions or dots. These larger dot regions would inherently provide higher sensitivity than the areas of the electrode that are thin.

In another alternative embodiment the electrodes are shaped to give electrical nonlinearity responses for certain geometric shapes. Similarly, the shape of the electrodes could be modified to increase linearity.

The next embodiment of the present invention uses mutual capacitance instead of self-capacitance to determine the position of a finger relative to a sense electrode by driving a signal on a nearby or immediately adjacent drive electrode.

Figure 4:
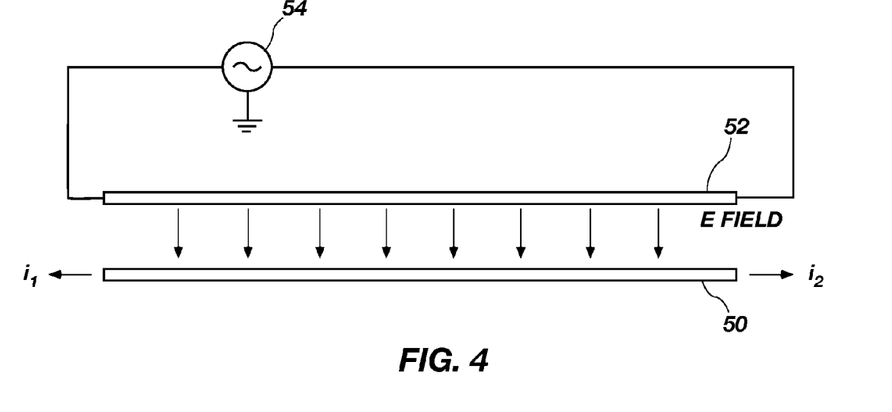
FIG. 4 is a schematic diagram showing how a single drive and single sense electrodes can be used in a mutual capacitance current divider method.

As shown in FIG. 4, this first mutual capacitance method will be referred to as the Current Divider method. In the Current Divider method the current i1 and i2 is measured at each end of a resistive sense electrode 50 as a result of a step in voltage applied to a nearby drive electrode 52 that is of low or high resistance.

In FIG. 4, both ends of the drive electrode 52 are driven with the same square wave or any other time varying voltage using voltage source 54. Simultaneously, the sense electrode 50 is coupled at each end to the sensing circuits. In this case, the sensing circuits are measuring the current i1 and i2 coming from each arbitrarily designated ends of the sense electrode 50.

As in the self-capacitance method, the nominal or baseline current is determined by making measurements with no finger or other contact present on or near the sense electrode 50, resulting in i1 nominal and i2 nominal. The position of the finger above and also along the sensor can then be determined by repeating the measurements with the finger present resulting in i1 finger and i2 finger, and using the following current divider formula for position P.

$$i1 = i1\_nominal - i1\_finger$$

$$i2 = i2\_nominal - i2\_finger$$

$$Z = i1 + i2$$

$$P = i1/Z$$

It should be understood that the equations can also be used as in the self-capacitance method and determine the position P of the finger relative to the end where i2 is measured as opposed to finding the position P relative to the to the end where i1 is measured as is shown above.

Figure 5:
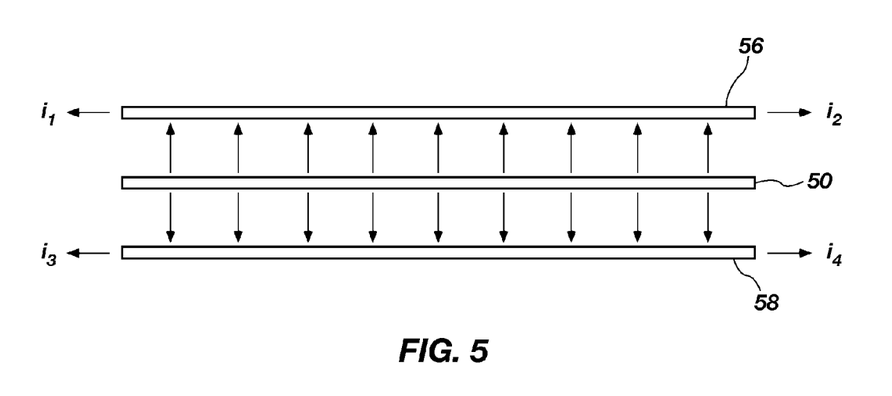
FIG. 5 is a modified version of FIG. 4 but with the addition of another sense electrode so as to be on both sides of the drive electrode, wherein the circuit reduces noise by simultaneously measuring the current at four locations.

This mutual capacitance method inherently has more variation to the design of the electrodes than in the case of self-capacitance because in that case the drive and sense electrode are the same electrode. With mutual capacitance, there can be a different number of sense and drive electrodes, and the electrodes can be positioned in different ways. For example, consider FIG. 5. In FIG. 5, a single drive electrode 50 is now surrounded on either side by two sense electrodes 56 and 58. One of the advantages is that it is possible to measure more sense electrode currents at the same time. By measuring the sense currents i1, i2, i3 and i4, the system has better immunity to noise. By measuring more than one sense electrode at a time the scan rate is also improved.

There are not only various electrode layouts that can be used, but scanning patterns for those layouts. Consider FIG. 6 which shows a plurality of electrodes. In the first pattern 60, the electrodes are divided into electrode pairs. In this pattern, one electrode is drive and one electrode is sense. The array is scanned in electrode pairs until all electrodes are scanned. Alternatively, the electrodes are scanned in groups of three 62, with the center electrode serving as the drive electrode and the outer electrodes serving as the sense electrodes.

Another scan pattern is to drive a balanced pattern with one or more electrodes being driven positive and an equal number of electrodes being driven negative. This electrical pattern can be shifted or scanned across the entire electrode array.

In another alternative drive pattern, every other electrode is driven with Orthogonal Codes in a certain number of measurements and the electrodes that aren't driven are all connected at each end to two different sensing circuits. Orthogonality exploits mathematical properties of orthogonality between vectors representing the data strings. For example, binary string "1011" is represented by the vector (1, 0, 1, 1). Vectors can be multiplied by taking their dot product, by summing the products of their respective components. If the dot product is zero, the two vectors are said to be orthogonal to each other. Driving electrodes using orthogonal codes is a method already known to those skilled in the art, and can be applied to the present invention.

In another alternative scanning pattern, every other electrode is driven with the same pattern and the electrodes that aren't driven will be measured independently or summed together in Orthogonal Code patterns.

Figure 6:
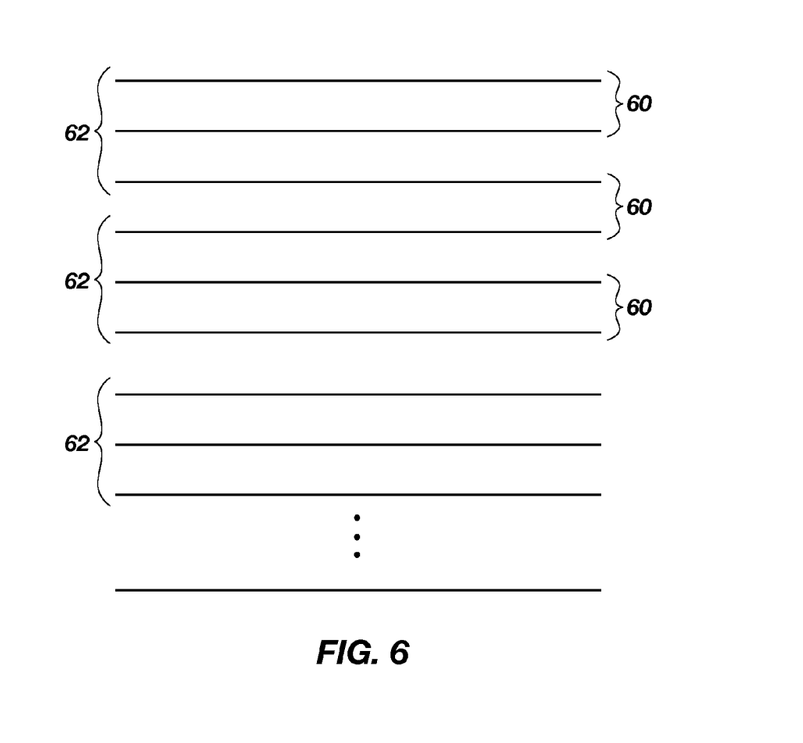
FIG. 6 shows different scanning patterns that can be used when doing any mutual capacitance method.
Figure 7:
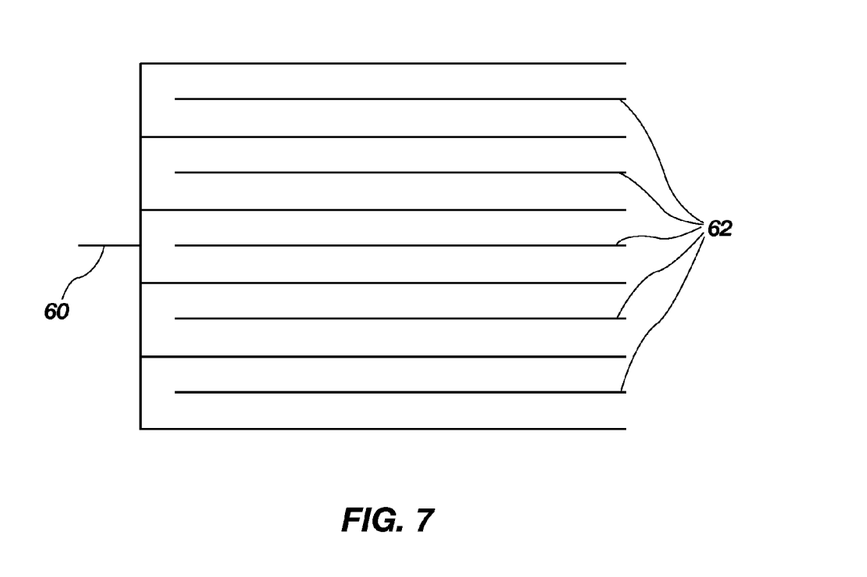
FIG. 7 shows a single interdigitated sense electrode and a plurality of drive electrodes that can be used when using the mutual capacitance methods.

It was also stated that different physical layouts can be used. For example, the drive and sense electrodes can all be electrically isolated from each other as shown in FIG. 6. In an alternative embodiment, the sense electrodes could be a single sense electrode 60 that is interdigitated with the drive electrodes 62, as shown in FIG. 7. Alternatively the drive electrode could be a single large sheet, and the sense electrodes could be disposed above the sheet in an array.

It should be understood that the present invention can also be used for multi-finger detection and tracking. The position of one or more fingers or conductive objects can be determined by various methods such as weighted average or slope detection or zero cross or peak detection except when multiple objects are on the same electrode.

One method for determining the position of two objects on the same electrode is to infer that two fingers are present because of the immediate prior tracking history when the two fingers were on different electrodes and had separate signals. Two fingers on the same electrode have a combined resulting signal that is about twice as large as when there is a single finger. The calculated position would then just be at the midpoint of the distance between the two fingers. The calculated position for each finger would then be estimated using the immediate prior position history and current combined position. This would only last as long as the fingers are on the same electrode.

In alternative multi-finger position embodiments, another technique is to infer two fingers from the difference in the ratio calculations for electrodes near the finger position. This is done by determining the position ratio value (X) for each electrode in the vicinity of the fingers. Then examine the ratio values and determine the difference of the average of the distant electrode values (V2). Calculate the two finger positions using the ratio value (X) as the average value of the fingers positions and displace each finger by ½ V2.

Another technique for determining the finger position is to examine the RC time constant or group delay for each sensing circuit An alternative to touching with a finger or grounded object is to place small floating conductors above the sense electrodes such as carbon pills or metal snap domes in a keymat. When these floating conductors come closer to the sensor due to pushing with a finger, the coupling between the drive electrode and sense electrode increases. The floating conductor position is calculated using the same equations.

The next embodiment of the present invention also uses mutual capacitance instead of self-capacitance to determine the position of a finger relative to a sense electrode by driving a signal on a nearby or immediately adjacent drive electrode. However, instead of using a current divider circuit, this next embodiment uses a voltage divider circuit.

Figure 8:
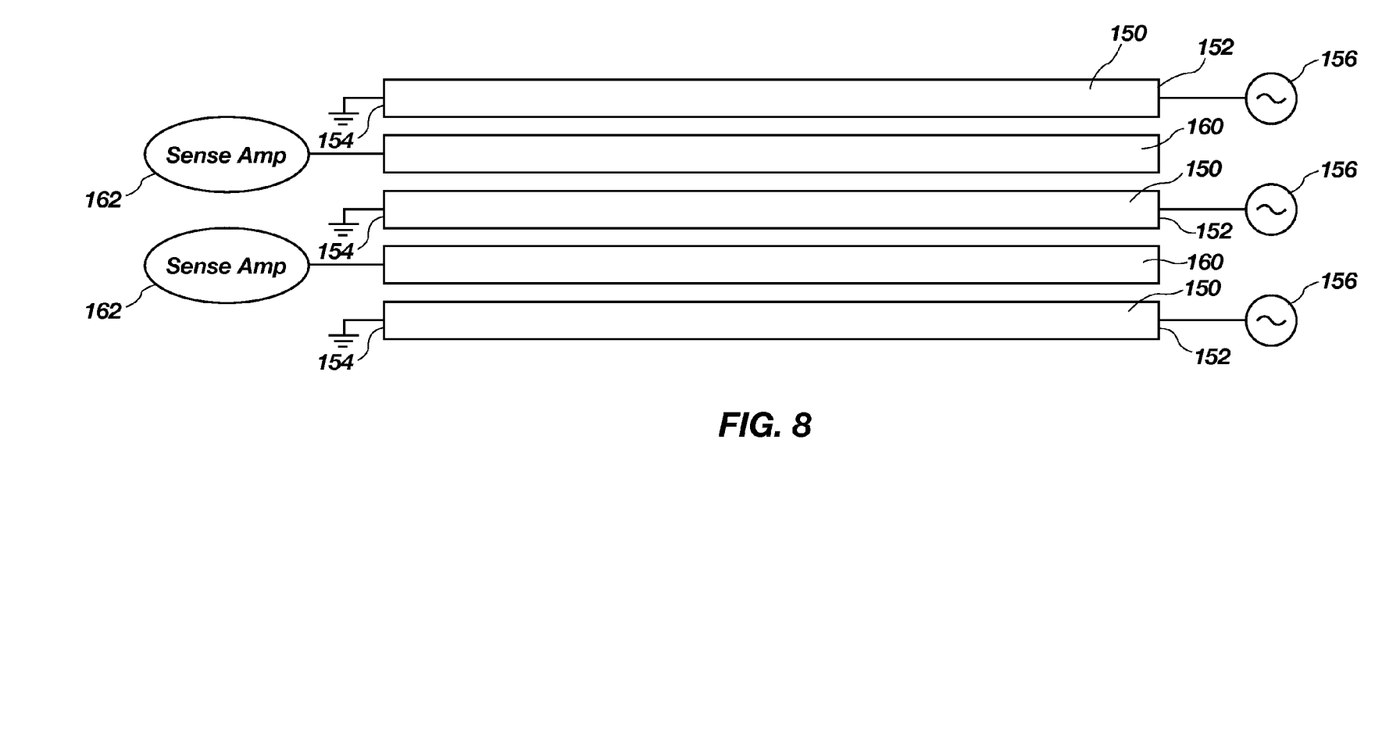
FIG. 8 is a schematic diagram of a mutual capacitance embodiment of drive and sensor electrodes wherein the drive electrodes are being driven at one end and grounded at the opposite end for a first measurement, and referred to as the voltage divider method.

FIG. 8 is a schematic diagram showing a first embodiment of the present invention. The number of electrodes is for illustration purposes only and should not be considered limiting. Therefore, three drive electrodes 150 are shown configured for a first measurement. For the first measurement, all the drive electrodes 150 are driven from a first end 152, and are grounded at an opposite second end 154. Each of the drive electrodes 150 is coupled to drive circuitry such as an ASIC 156 (application specific integrated circuit) for driving the electrodes. Each ASIC 156 drives selected drive electrodes 150 with various electrical patterns. Thus, it is another aspect of the invention that each of the drive electrodes 150 can have a unique electrical pattern when being driven. These various drive patterns can be scanned one at a time or multiple at the same time.

Alternatively, another pattern is to drive multiple electrodes with opposite phases with a fixed separation. Another pattern is to drive multiple electrodes with opposite or shifted phases or multiple frequencies with Orthogonal code patterns.

An important aspect of the invention is that each ASIC 156 can be coupled to either end of its drive electrode 150. Thus, when one end of a drive electrode 150 is coupled to an ASIC 156, the opposite end is always configured to be coupled to ground.

Sense electrodes 160 are disposed between each of the drive electrodes 150. Each of the sense electrodes 160 is coupled to a sense amplifier 162 and an Analog-to-Digital Converter (ADC) 164 for measuring the signal on the sense electrodes 160.

It should be understood that the number of sense electrodes 150 and drive electrodes 160 can be increased or decreased depending upon the needs of the touchpad design.

Figure 9:
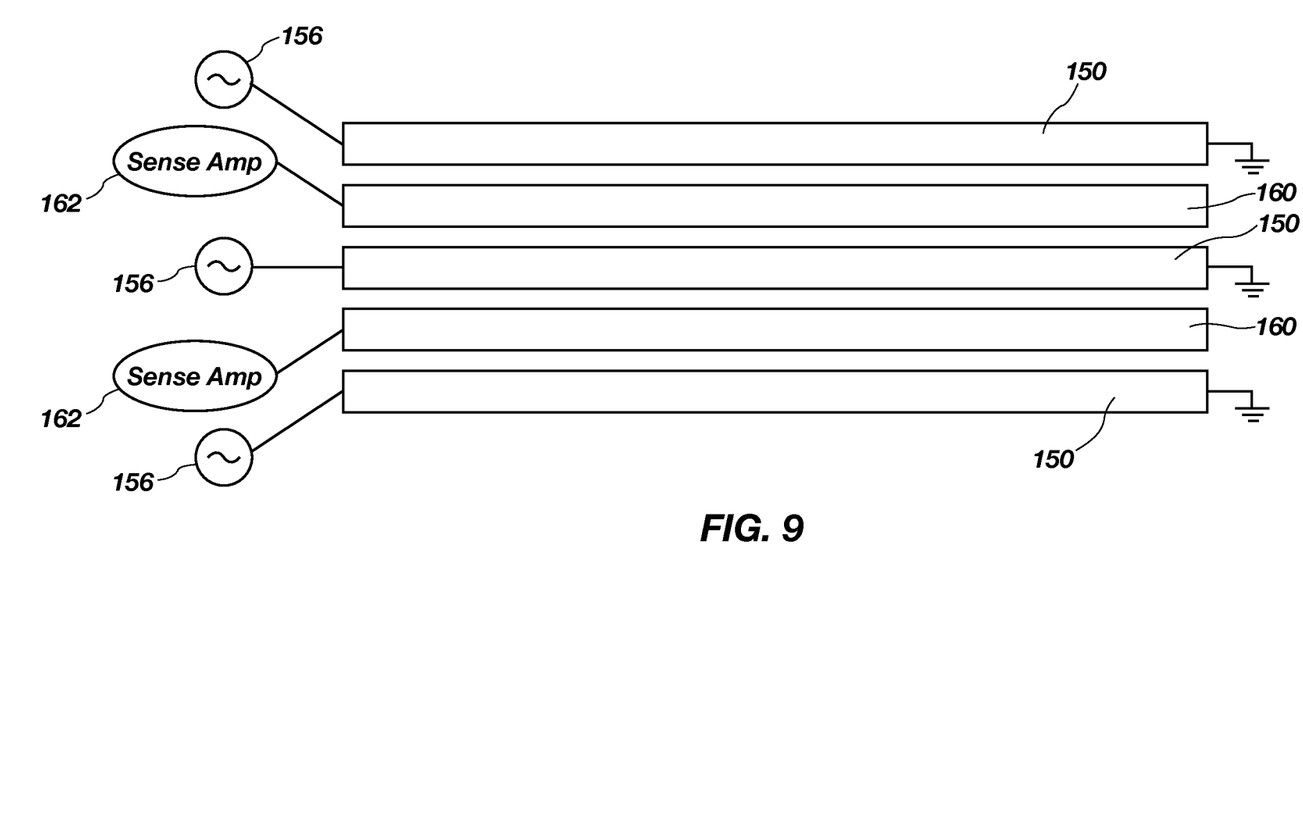
FIG. 9 is a schematic diagram of the embodiment of drive and sensor electrodes as shown in FIG. 8, but wherein the drive electrodes are now switched so that they are being driven at an opposite end and grounded at the other end.

For the first measurement, each ASIC 156 simultaneously provides an appropriate drive signal on the first end of each drive electrode 150 and the signal on each sense amplifier 162 is then measured. After the first measurement is taken, the drive electrodes 150 are reconfigured so that the ASIC 156 is now coupled to the second end 154, and the first end 152 is now grounded as shown in FIG. 9. The ASICs 156 are now driven with an appropriate signal, and then sense amplifiers 162 and ADCs 164 again measure the signal coupled to the sense electrodes 160.

The drive electrodes 150 and the sense electrodes 160 are made of parallel strips or rows of resistive conductors such as ITO or carbon ink on or in or under a touch surface.

The drive electrodes 150 have stimulus on one end and are grounded on the opposite end, thus creating a linear or varying electric field across the length of each drive electrode 150. After the first and second measurements are taken, this information is used to solve for X (or Y) position and Z height.

The following process can be used to calculate position, but should not be considered limiting, and is for illustration purposes only. Thus, if the first measurement is m1 and the second measurement is m2, and the baseline measurements are b1 and b2, then the finger contribution is the difference, or n1=m1−b1, n2=m2−b2.

The finger position can then be calculated as a fraction of the strip length where one end is zero and the other end is one. If the length of the strip is considered as the X axis, the finger X position then $$X = n1/(n1+n2)$$

The Z axis or finger sensitivity can be calculated as the sum of the two measurements, or $$Z = n1+n2$$

The finger position in the Y axis can be calculated by interpolating from adjacent sense electrodes and calculating the peak Z along the array of electrodes or from the slopes.

Measurements are taken without fingers touching the surface of the touchpad in order to obtain a baseline measurement. When a finger touches the sensor, typically the mutual capacitance between the drive electrode 150 and sense electrode 160 is reduced. The amount of charge induced on the sense electrode 160 is a function of position of the finger along the drive and sense electrodes 150, 160, and the size of the finger touching the electrodes. The difference in signal between the measurements of the baseline and when the finger is touching is used to calculate finger position and strength.

In an alternative embodiment, there is a single drive electrode 150 and a single sense electrode 60.

In another alternative embodiment, there is a single drive electrode 150 and a plurality of sense electrodes in order to capture surrounding electrical fields.

In another alternative embodiment, there are two drive electrodes 150, but they have opposite polarity such that nominal electric coupling to the sense electrode(s) 160 is balanced or nulled out and it is the presence of a finger that causes an electrical imbalance.

In another alternative embodiment, multiple drive and sense electrodes 150, 160 are simultaneously active which reduces noise and increases scan rate.

In another alternative embodiment, some grounded electrodes are interspersed among the drive electrodes 150 and the sense electrodes 160 so that the finger can have an electrical common reference with the touchpad for when the touchpad has small self-capacitance and is not connected to a significant ground reference. For example, this might be when the touchpad is in a mobile device such as a cell phone.

In another alternative embodiment, drive and sense electrodes could be fixed and dedicated, or they could be completely configurable in order to function as a drive or sense electrode as needed.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for detecting a conductive object using a single-layer capacitive sensor design using mutual capacitance and a voltage divider, said method comprising the steps of:

providing an electrically isolated and dedicated drive electrode and an electrically isolated and dedicated sense electrode disposed in parallel and on a planar insulating substrate;
   coupling a step voltage source to a first end of the drive electrode while grounding an opposite second end;
   measuring a signal on the sense electrode;
   reconfiguring the step voltage source so as to be coupled to the second end and grounding the first end of the drive electrode;
   measuring a signal on the sense electrode; and
   using a ratiometric equation to determine the position of a conductive object a distance P from the end of the sense electrode where the current $i1$ is measured.

2. The method as defined in claim 1 wherein the method further comprises the steps of:

(1) providing a plurality of electrically isolated and dedicated drive electrodes parallel to a plurality of electrically isolated and dedicated sense electrodes and disposed on the insulated substrate; and
   (2) determining the position of the conductive object for each of the plurality of sense electrodes in sequence from one end of the array to the other to thereby determine the position of the conductive object along an axis defined by a length of the plurality of sense electrodes.

3. The method as defined in claim 2 wherein the method further comprises the step of determining the position of the conductive object in an axis that is orthogonal to the axis of the plurality of sense electrodes by using interpolation of the relative amount of current that is being driven to each of the plurality of sense electrodes, wherein sense electrodes closer to the conductive object will draw more current.

* * * * *